US012754800B2

(12) United States Patent
Teng

(10) Patent No.: US 12,754,800 B2
(45) Date of Patent: Oct. 6, 2026

(54) DECODER CIRCUIT, FLASH MEMORY CONTROLLER, AND DECODING METHOD

(71) Applicant: Silicon Motion, Inc., Hsinchu County (TW)

(72) Inventor: Duen-Yih Teng, Hsinchu County (TW)

(73) Assignee: Silicon Motion, Inc., Hsinchu County (TW)

(*) Notice: Subject to any disclaimer, the term of this patent is extended or adjusted under 35 U.S.C. 154(b) by 80 days.

(21) Appl. No.: 18/950,158

(22) Filed: Nov. 17, 2024

(65) Prior Publication Data

US 2025/0284588 A1 Sep. 11, 2025

(30) Foreign Application Priority Data

Mar. 7, 2024 (TW) ................................ 113108292

(51) Int. Cl.
*G06F 11/10* (2006.01)

(52) U.S. Cl.
CPC ...... *G06F 11/1048* (2013.01); *G06F 11/1016* (2013.01); *G06F 11/1068* (2013.01)

(58) Field of Classification Search
CPC ............. G06F 11/1048; G06F 11/1016; G06F 11/1068; G06F 11/1053
USPC .......................................................... 714/752
See application file for complete search history.

(56) References Cited

U.S. PATENT DOCUMENTS

| | | | | |
|---|---|---|---|---|
| 11,108,407 | B1 * | 8/2021 | Lu | H03M 13/1111 |
| 2011/0314352 | A1 | 12/2011 | Djordjevic | |
| 2013/0139023 | A1 * | 5/2013 | Han | G11B 20/1866 714/752 |
| 2019/0173497 | A1 | 6/2019 | El-Khamy | |
| 2023/0170921 | A1 | 6/2023 | Eun | |
| 2024/0022262 | A1 * | 1/2024 | Roth | H03M 13/015 |

FOREIGN PATENT DOCUMENTS

TW 201436476 A 9/2014

* cited by examiner

*Primary Examiner* — Albert Decady
*Assistant Examiner* — Enam Ahmed
(74) *Attorney, Agent, or Firm* — Winston Hsu

(57) ABSTRACT

A decoding method includes: receiving and storing input data as a channel value in a channel value memory in a form of codeword; generating a posterior probability and a variable-to-check message according to a specific chunk of the channel value; converting the variable-to-check message from variable node domain into check node domain to generate a converted variable-to-check message; using a check node unit to generate a check-to-variable message according to the converted variable-to-check message; converting the check-to-variable message from check node domain into variable node domain to generate a converted check-to-variable message; determining whether to flip at least one bit of the specific chunk according to the posterior probability; and, determining whether to ignore and skip execution of decoding calculation for the specific chunk in a next iterative decoding operation according to whether a decoding calculation result in a current iterative decoding operation matches with a specific condition.

12 Claims, 4 Drawing Sheets

The n-th iterative decoding operation (processing times 0–9) | The (n+1)-th iterative decoding operation (processing times 10–16 ...)

| Processing time | 0 | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|---|
| Address | 0 | 1 | 2 | 3 | 4 | 5 | 6 | 7 | 8 | 9 | 0 | 1 | 2 | 3 | 4 | 5 | 6 | ... |

(A) Output consecutive addresses

The n-th iterative decoding operation (processing times 0–9) | The (n+1)-th iterative decoding operation (processing times 10–13) | The (n+2)-th iterative decoding operation (processing times 14–16 ...)

| Processing time | 0 | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|---|
| Address | 0 | 1 | 2 | 3 | 4 | 5 | 6 | 7 | 8 | 9 | 0 | 1 | 2 | 3 | 0 | 1 | 2 | ... |

(B) Skip outputs of some addresses in the (n+1)-th iterative decoding operation

FIG. 2

DECODER CIRCUIT, FLASH MEMORY CONTROLLER, AND DECODING METHOD

BACKGROUND OF THE INVENTION

1. Field of the Invention

The present invention relates to a decoding scheme, and more particularly to a decoder circuit, a corresponding flash memory controller, and a corresponding decoding method.

2. Description of the Prior Art

Generally speaking, when a traditional low-density parity-check code decoding algorithm performs calculations of iterative decoding operation, the decoding operation is performed upon all bits of a codeword in each iterative decoding operation. For example, in the process, the relevant probability values of all bits are calculated sequentially to determine whether to perform bit flipping. The traditional decoding algorithm interrupts the calculations of the iterative decoding operation only when the syndrome value calculated for an updated codeword is equal to zero. However, this results in a too long average time required for decoding calculations, and this cannot meet the needs of existing products.

SUMMARY OF THE INVENTION

Therefore one of the objectives of the present invention is to provide a decoder circuit, a corresponding flash memory controller, and a corresponding decoding method to solve the above-mentioned problems.

According to embodiments of the present invention, a decoder circuit is disclosed. The decoder circuit comprises a channel value memory, a variable node unit, a first barrel shifter, a check node unit, a second barrel shifter, a decision unit, and a strategy unit. The channel value memory is used for receiving and storing an input data as a channel value. The channel value is stored in the channel value memory as a codeword, and the channel value memory is configured to use multiple consecutive addresses to store multiple bit chunks of the codeword. The variable node unit, coupled to the channel value memory, is used for generating a posterior probability value and a variable-to-check message based on a specific bit chunk of the channel value and for updating the posterior probability value and the variable-to-check message according to a check-to-variable message generated by a check node unit. The first barrel shifter, coupled to the variable node unit, is used for converting the variable-to-check message from a variable node domain to a check node domain to generate a converted variable-to-check message. The check node unit, coupled to the first barrel shifter, is used for generating the check-to-variable message according to the converted variable-to-check message. The second barrel shifter, coupled to the check node unit, is used for converting the check-to-variable message from the check node domain to the variable node domain to generate a converted check-to-variable message to the variable node unit. The decision unit, coupled to the variable node unit, is used for determining whether to flip at least one bit of the specific bit chunk based on the posterior probability value. The strategy unit, coupled to the channel value memory, the variable node unit, the decision unit, and the check node unit, is used for determining whether to ignore and skip a decoding calculation corresponding to the specific bit chunk in at least one subsequent iterative decoding operation based on whether a decoding calculation result corresponding to the specific bit chunk satisfies a specific condition.

According to the embodiments, a decoding method of a decoder circuit is disclosed. The decoding method comprises: providing a channel value memory for receiving and storing an input data as a channel value, the channel value being stored in the channel value memory as a codeword, the channel value memory being configured to use multiple consecutive addresses to store multiple bit chunks of the codeword; using a variable node unit to generate a posterior probability value and a variable-to-check message based on a specific bit chunk of the channel value and to update the posterior probability value and the variable-to-check message according to a check-to-variable message generated by a check node unit; converting the variable-to-check message from a variable node domain to a check node domain to generate a converted variable-to-check message; using the check node unit to generate the check-to-variable message according to the converted variable-to-check message; converting the check-to-variable message from the check node domain to the variable node domain to generate a converted check-to-variable message to the variable node unit; using a decision unit to determine whether to flip at least one bit of the specific bit chunk based on the posterior probability value; and, determining whether to ignore and skip a decoding calculation corresponding to the specific bit chunk in at least one subsequent iterative decoding operation based on whether a decoding calculation result corresponding to the specific bit chunk satisfies a specific condition.

According to the embodiments, a flash memory controller is disclosed. The flash memory controller comprises an encoder and a decoder circuit. The encoder is used for performing a encoding operation upon a write data sent from a host device to write the write data into a flash memory. The decoder circuit is used for performing a decoding operation upon a read data read out from the flash memory to generate a decoded read data. The decoder circuit comprises a channel value memory, a variable node unit, a first barrel shifter, a check node unit, a second barrel shifter, a decision unit, and a strategy unit. The channel value memory is used for receiving and storing an input data as a channel value. The channel value is stored in the channel value memory as a codeword, and the channel value memory is configured to use multiple consecutive addresses to store multiple bit chunks of the codeword. The variable node unit, coupled to the channel value memory, is used for generating a posterior probability value and a variable-to-check message based on a specific bit chunk of the channel value and for updating the posterior probability value and the variable-to-check message according to a check-to-variable message generated by a check node unit. The first barrel shifter, coupled to the variable node unit, is used for converting the variable-to-check message from a variable node domain to a check node domain to generate a converted variable-to-check message. The check node unit, coupled to the first barrel shifter, is used for generating the check-to-variable message according to the converted variable-to-check message. The second barrel shifter, coupled to the check node unit, is used for converting the check-to-variable message from the check node domain to the variable node domain to generate a converted check-to-variable message to the variable node unit. The decision unit, coupled to the variable node unit, is used for determining whether to flip at least one bit of the specific bit chunk based on the posterior probability value. The strategy unit, coupled to the channel value memory, the variable node unit, the decision unit, and the check node unit, is used for determining whether to ignore and skip a decoding calculation corresponding to the specific bit chunk in at least one subsequent iterative decoding operation based on whether a decoding calculation result corresponding to the specific bit chunk satisfies a specific condition.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a schematic diagram showing the comparison between the strategy unit determining not to ignore and skip bit chunks and the strategy unit determining to ignore and skip bit chunks according to an embodiment of the present invention.

DETAILED DESCRIPTION

Figure 1:
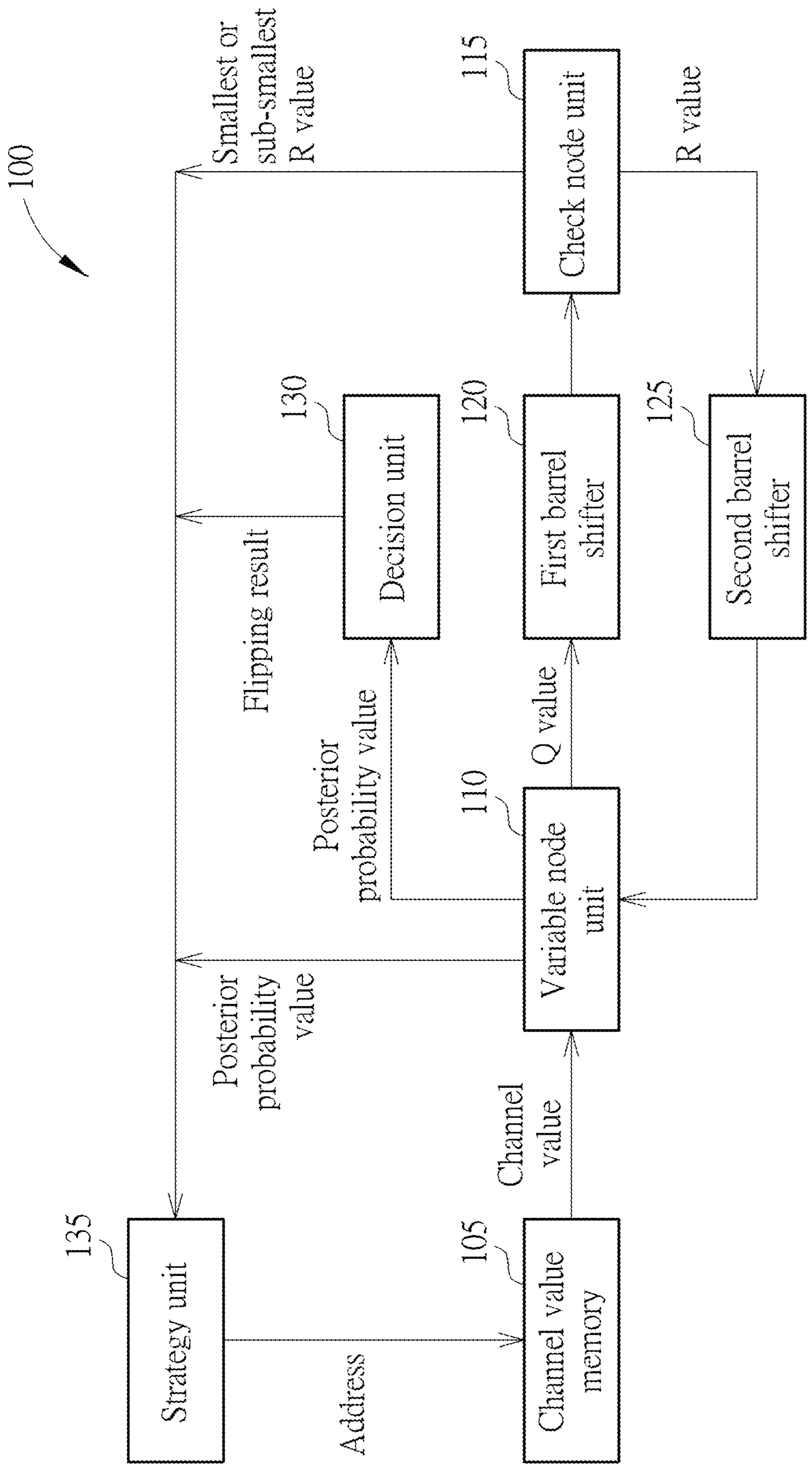
FIG. 1 is a schematic diagram of a decoder circuit according to an embodiment of the present invention.

Please refer to FIG. 1. FIG. 1 is a schematic diagram of a decoder circuit 100 according to an embodiment of the present invention. The decoder circuit 100 includes a channel value memory 105, a variable node unit (VNU) 110, a check node unit (CNU) 115, a first barrel shifter 120, a second barrel shifter 125, a decision unit 130, and a strategy unit 135. The above-mentioned units or components, for example, the variable node unit 110, the check node unit 115, the decision unit 130, and the strategy unit 135 can be implemented using hardware circuits or firmware circuits.

Specifically, the value of an input data initially received by the decoder circuit 100 is stored in the channel value memory 105. In one embodiment, the decoder circuit 100 is applied to a storage device. The value of the received input data for example is the data read from one or more flash memories of the storage device. If the decoder circuit 100 is applied to a communication system, then the value of the received input data is, for example, the data received from a mobile communication device such as a mobile phone. In addition, the channel value memory 105 can receive and store the value of the input data in the form of a codeword. Then, the variable node unit 110 reads the input data (i.e. the stored codeword) from the channel value memory 105.

It should be noted that in the following paragraphs, the wording 'channel value' is used to represent a value received by the decoder circuit 100 and stored into the channel value memory 105. In addition, when the decoder circuit 100 is for example applied to a storage device having one or more flash memories, a sensing read operation is performed upon the potential of a specific bit of a codeword stored in the flash memory to use a reference voltage level to read the potential of the specific bit to generate a sign bit and multiple magnitude bits which can indicate the potential of the specific bit. The sign bit is used to indicate at which side of the reference voltage level the potential of the specific bit is located, and the multiple bits are used to indicate an absolute value of the difference between the potential of the specific bit and the reference voltage level. The more multiple bits are used, the more accurate results of sensing read operation can be achieved. Therefore, in this embodiment, in practice, a channel value stored in the channel value memory 105 refers to the sign bit and the multiple magnitude bits. Similarly, when the decoder circuit 100 is applied to a communication system, for example, a channel value may include a value transmitted by the transmission medium/channel in the communication system and may also be stored in the channel value memory 105 by using a sign bit and multiple magnitude bits.

In one embodiment, the decoder circuit 100 is a low-density parity-check code (LDPC code) decoder circuit and performs an LDPC decoding operation based on a standard column-layered min-sum algorithm. The variable node unit 110 is used to perform a sum operation/calculation of a vertical step in the LDPC decoding operation, and the check node unit 115 is used to perform a minimization calculation of a horizontal step in the LDPC decoding operation.

The following briefly describes the concept of column-layered min-sum algorithm. An input data is a binary LDPC codeword indicated by C. The corresponding parity check matrix has M rows and N columns and can be represented by H. Each row of the corresponding parity check matrix H is associated with a corresponding check node, and each column of the corresponding parity check matrix H corresponds to a variable node. $N(c)=\{v:H_{cv}=1\}$ is used to indicate a set of variable nodes which participate in the calculation of a check node c. $M(v)=\{c:H_{cv}=1\}$ is used to indicate a set of check nodes which participate in the calculation of a variable node v. $I_v$ is the intrinsic message of a variable node v. $R_{cv}$ is a check-to-variable message converted from a check node c to a variable node v, and for example can be also called as an R value (R message). $L_{cv}$ is a variable-to-check message converted from a variable node v to a check node c, and can be also called as a Q value (Q message). A codeword having N bits is divided into G groups having the same size. The G groups are represented by $N_0$, $N_0$, . . . , $N_{G-1}$, and for example the corresponding parity check matrix H is also divided into G block columns having the same size. The iterative decoding concept of the column-layered min-sum algorithm can be described using the following equation. First, at the initial time:

$$L_{cv}=I_v \text{ for } v=0,1,\ldots,N-1,\ c=0,1,\ldots,M-1;$$

Then, during the iterative decoding process from the first iteration (i.e. iteration for the first time) to the maximum iteration number, for each in the G groups, i.e. the group $N_g$ and g=0, 1, . . . G−1, in the horizontal step, for each check node c connected to the variable node V belonging to a specific group $N_g$, the calculation of R value $R_{cv}$ can be expressed by the following formula:

$$R_{cv}=\prod\nolimits_{n\in N(c)\backslash v}\operatorname{sgn}(L_{cn})\times\min_{n\in N(c)\backslash v}|L_{cn}|;$$

in addition, in the vertical step, for each variable node v belonging to the specific group $N_g$, the calculation and update of the Q value $L_{cv}$ and value $L_v$ are expressed by the following equations:

$$L_{cv}=I_v+\alpha\times\sum\nolimits_{m\in M(v)\backslash c}R_{mv}$$

-continued $$L_v = I_v + \alpha \times \sum_{m \in M(v)} R_{mv}$$

in the iterative decoding process of the column-layer min-sum algorithm, the $L_v$ value is a log likelihood ratio which is used as a posterior probability value (which can also be referred to as APP value for short), and the positive/negative sign of the $L_v$ value is used to make a hard decision to determine the information ('0' or '1') of the specific bit. When a valid codeword is found, the above iterative decoding operation can be interrupted to complete the decoding operation.

In the embodiment of the present invention, one or more codewords are stored in the channel value memory 105. For example, a codeword is stored in consecutive N addresses of the channel value memory 105 in the form of N consecutive chunks. For example, N is equal to 10, and a chunk (or segment) includes multiple bits and can also be called a bit chunk. The channel value memory 105 is used to output one bit chunk each time, e.g. every processing time (cycle). In the calculation of each iterative decoding operation of the LDPC decoding operation, multiple bit chunks (for example 10 chunks) of a codeword are processed and calculated sequentially, and the number of the multiple bit chunks in the default setting corresponds to and is equal to the number of variable nodes to be processed and calculated in the each iterative decoding operation, e.g. 10 variable nodes. In other words, a codeword having 10 bit chunks for example requires 10 processing times to perform relevant decoding calculations in the default setting.

Specifically, in the default setting, the strategy unit 135 is used to generate and output multiple consecutive different addresses to the channel value memory 105 one by one, so that the channel value memory 105 based on these consecutive addresses can output different successive bit chunks to the variable node unit 110 one by one at successive different processing times. When a specific condition is satisfied, the strategy unit 135 can determine to skip the output of one or more addresses to control the channel value memory 105 not to output one or more bit chunks corresponding to the one or more addresses that are selected to be skipped, and thus in the subsequent operation the variable node unit 110 and the check node unit 115 can ignore the calculation and update of the skipped one or more bit chunks, thereby shortening the overall decoding time. Also, under the condition that the overall decoding time remains unchanged, other remaining processing times can be used in the decoding operations of other bit chunks that have not been ignored, so as to improve the correction capability for decoding.

In an iterative decoding operation (for example, the n-th iterative decoding operation wherein n is a positive integer), when a specific bit chunk is received by the channel value memory 105, the variable node unit 110 generates (or updates) and outputs a variable-to-check message (also called Q value, which is a probability value) to the first barrel shifter 120 according to the specific bit chunk, and generates (or updates) and outputs a log likelihood ratio (that is, the above-mentioned posterior probability $L_v$) to the decision unit 130. Then, the first barrel shifter 120 is used to convert the variable-to-check message (Q value) from a variable node domain to a check node domain to generate a converted variable-to-check message to the check node unit 115, and the check node unit 115 generates a check-to-variable message (also known as R value, which is another probability value) to the second Barrel shifter 125 according to the minimization equation/algorithm of the above-mentioned R value $R_{cv}$ and the converted variable-to-check message. The second barrel shifter 125 is used to convert the check-to-variable message (R value) from a check node domain to a variable node domain to generate a converted check-to-variable message to the variable node unit 110. Therefore, the variable node unit 110 can perform a sum operation to generate and update the variable-to-check message (Q value $L_{cv}$) based on one or more check-to-variable messages (R values, probability values) transmitted from the second barrel shifter 125 and can perform another sum operation to generate and update the value $L_v$ according to the probability values of one or more check-to-variable messages transmitted from the second barrel shifter 125. The value $L_v$ is a log likelihood ratio and is used as the value of the posterior probability and will be outputted to the decision unit 130. In this way, the variable-to-check message (Q value $L_{cv}$) and the posterior probability (the value $L_v$) are updated to perform a decoding operation upon the specific bit chunk in this iterative decoding operation.

Then, the generated and updated posterior probability value (the value $L_v$) may be a positive value or a negative value. The decision unit 130 adopts the sign of the generated and updated posterior probability value (the value $L_v$) to make a hard decision to determine whether to flip the information ('0' or '1') of one or more bits in the specific bit chunk. The decision unit 130 then calculates the syndrome value based on the flipped or un-flipped bits of the specific bit chunk and/or the flip results (there may be bits that are flipped or bits that are not flipped) of multiple previous bit chunks. If the calculated syndrome value is zero, then this means that a valid codeword is found, and the entire iterative decoding operation can be interrupted and the decoding operation completed.

In an embodiment of the present invention, in order to significantly reduce the time required for decoding, the strategy unit 135 may determine whether to ignore the calculation executed upon the specific bit chunk in subsequent iterative decoding operation(s) based on at least one among the output of the variable node unit 110, the output of the decision unit 130, and the output of the check node unit 115. That is, the strategy unit 135 can determine whether a specific condition is satisfied based on a calculation result generated for the specific bit chunk in the current iterative decoding operation and/or the calculation result generated for the specific bit chunk in the previous iterative decoding operation(s). When the specific condition is satisfied, the strategy unit 135 can ignore the calculation result for the specific bit chunk (the same bit chunk) in the subsequent iterative decoding operation(s). For example, the strategy unit 135 can determine whether to ignore the output of the address corresponding the same specific bit chunk in the subsequent (n+1)-th iterative decoding operation (or one or more subsequent iterative decoding operations in the future) according to at least one among the channel value, the value of the posterior probability, the syndrome value, and at least one sub-smallest R value calculated by the check node unit which are calculated in the n-th iterative decoding operation. When the output of the corresponding address is ignored, the strategy unit 135 can equivalently control the channel value memory 105 to not output the specific bit chunk during the processing times of the subsequent (n+1)-th iterative decoding operation (or one or more subsequent iterative decoding operations in the future), so as to ignore one or more decoding calculations for the specific bit chunk in the subsequent (n+1)-th iterative decoding operation (or one or more subsequent iterative decoding operations in the future). This can achieve that more processing times can be provided to the other bit chunks to perform decoding operations, so that more iterative decoding operations can be provided for the other bit chunks to solve the correct bits, to improve the correction capability of decoding.

In one embodiment, the posterior probability value generated and updated by the variable node unit 110 may be a positive value or a negative value. The strategy unit 135 determines whether to perform the ignore and skip operation based on the magnitude value (i.e. absolute value) of the updated posterior probability value. For example, the strategy unit 135 compares the magnitude value of the updated posterior probability value with a specific threshold value. When the magnitude value (i.e. absolute value) of the updated posterior probability value is greater than the specific threshold value, the strategy unit 135 can determine that the sign value of the updated posterior probability value corresponding to the specific bit chunk in this iterative decoding operation is more reliable, i.e. the larger reliability. Thus, the strategy unit 135 can determine to perform the ignore and skip operation in the subsequent one or more iterative decoding operations; that is, the decoding calculation corresponding to the specific bit chunk is not executed/performed in the subsequent one or more iterative decoding operations. When the magnitude value (i.e. the absolute value) of the updated posterior probability value is less than the specific threshold value, the strategy unit 135 can determine that the sign value of the updated posterior probability value corresponding to the specific bit chunk in this iterative decoding operation is less reliable, i.e. the smaller reliability, and thus can determine not to perform the ignore and skip operation in the subsequent one or more iterative decoding operations.

In addition, in one embodiment, the decision unit 130 determines whether to flip one or more bits in the bits of the specific bit chunk, and the strategy unit 135 records bit flipping results in multiple consecutive iterative decoding operations and determines whether to ignore and skip the decoding calculations corresponding to the specific bit chunk in the subsequent iterative decoding operation(s) according to the bit flipping results such as the bit flipping results corresponding to the same specific bit chunk in two consecutive iterative decoding operations (e.g. the current iterative decoding operation and a previous iterative decoding operation). For example, when bit flipping results of any two consecutive iterative decoding operations indicate that the same specific bit chunk has not been flipped, the strategy unit 135 may determine to ignore and skip the decoding calculation for the same specific bit chunk in the next iterative decoding operation. That is, the variable node unit 110, the check node unit 115, the barrel shifters 120, 125, and the decision unit 130 do not perform calculations for the specific bit chunk in the next iterative decoding operation. Alternatively, when other conditions occur (i.e. no consecutive iterative decoding operations indicating that the same specific bit chunk has not been flipped), the strategy unit 135 determines not to perform the ignore and skip operation.

In addition, in one embodiment, the check node unit 115 generates and updates multiple R values, wherein the multiple R values respectively include a minimum R value and one or more other sub-smallest R values. For example, the strategy unit 135 may also compare one or more other sub-smallest R values with a specific reference threshold value to determine whether to ignore and skip the relevant decoding calculation for the specific bit chunk in the next iterative decoding operation.

FIG. 2 is a schematic diagram showing the comparison between the strategy unit determining not to ignore and skip bit chunks and the strategy unit determining to ignore and skip bit chunks according to an embodiment of the present invention. For example, a codeword has ten bit chunks, which can be respectively stored in ten consecutive addresses in the channel value memory 105, and the ten addresses are represented by index numbers 0 to 9 in sequence. In addition, different processing times can also be represented by different numbers. As shown in part (A) of FIG. 2, in the default setting, for example, in the n-th iterative decoding operation, the strategy unit 135 outputs different corresponding addresses 0-9 at different processing times 0-9 respectively and sequentially, to control the channel value memory 105 to sequentially output the ten bit chunks corresponding to the addresses 0-9, so that the relevant decoding calculations of the ten bit chunks can be performed in the n-th iterative decoding operation. Similarly, in the default setting, the strategy unit 135 outputs different corresponding addresses 0-9 respectively and sequentially at different processing times 10-19 (a portion is not shown in FIG. 2) in the (n+1)-th iterative decoding operation, to control the channel value memory 105 to sequentially output the ten bit chunks corresponding to the addresses 0-9 respectively, so that the corresponding decoding calculations for the ten bit chunks can be performed in the (n+1)-th iterative decoding operation. In the default setting, the strategy unit 135 is used to output consecutive addresses and does not ignore or skip one or some addresses. Thus, in each iterative decoding operation, the corresponding decoding calculations for the all bit chunks in the codeword are performed. On the contrary, as shown in part (B) of FIG. 2, in another default setting, the strategy unit 135 outputs different corresponding addresses 0-9 respectively and sequentially at different processing times 0-9 in the n-th iterative decoding operation, to control the channel value memory 105 to sequentially output the ten bit chunks corresponding to the addresses 0~9, so that the corresponding decoding calculations for the ten bit chunks are performed in the n-th iterative decoding operation. Then, the strategy unit 135 for example determines that the bit chunks at addresses 4 to 9 satisfy the above-mentioned specific condition and thus can be ignored and skipped. The strategy unit 135 outputs only the addresses 0-3 sequentially at processing times 10-13, so that the channel value memory 105 outputs the corresponding bit chunks of only the addresses 0-3 and does not output bit chunks of the other addresses 4-9. In other words, in the (n+1)-th iterative decoding operation, only four processing times are needed (different from the default setting which requires ten processing times) to complete the decoding calculations in the (n+1)-th iterative decoding operation. Then the decoding calculations of the (n+2)-th iterative decoding operation can be performed in the processing time 14~16 and subsequent processing times. In this way, by using the decision of the strategy unit 135 to ignore and skip certain addresses, the calculations of the bit chunks can be ignored and skipped (i.e. not executed) in the subsequent iterative decoding operations. More processing times can be saved and provided for the decoding calculations of the other iterative decoding operations.

Figure 3:
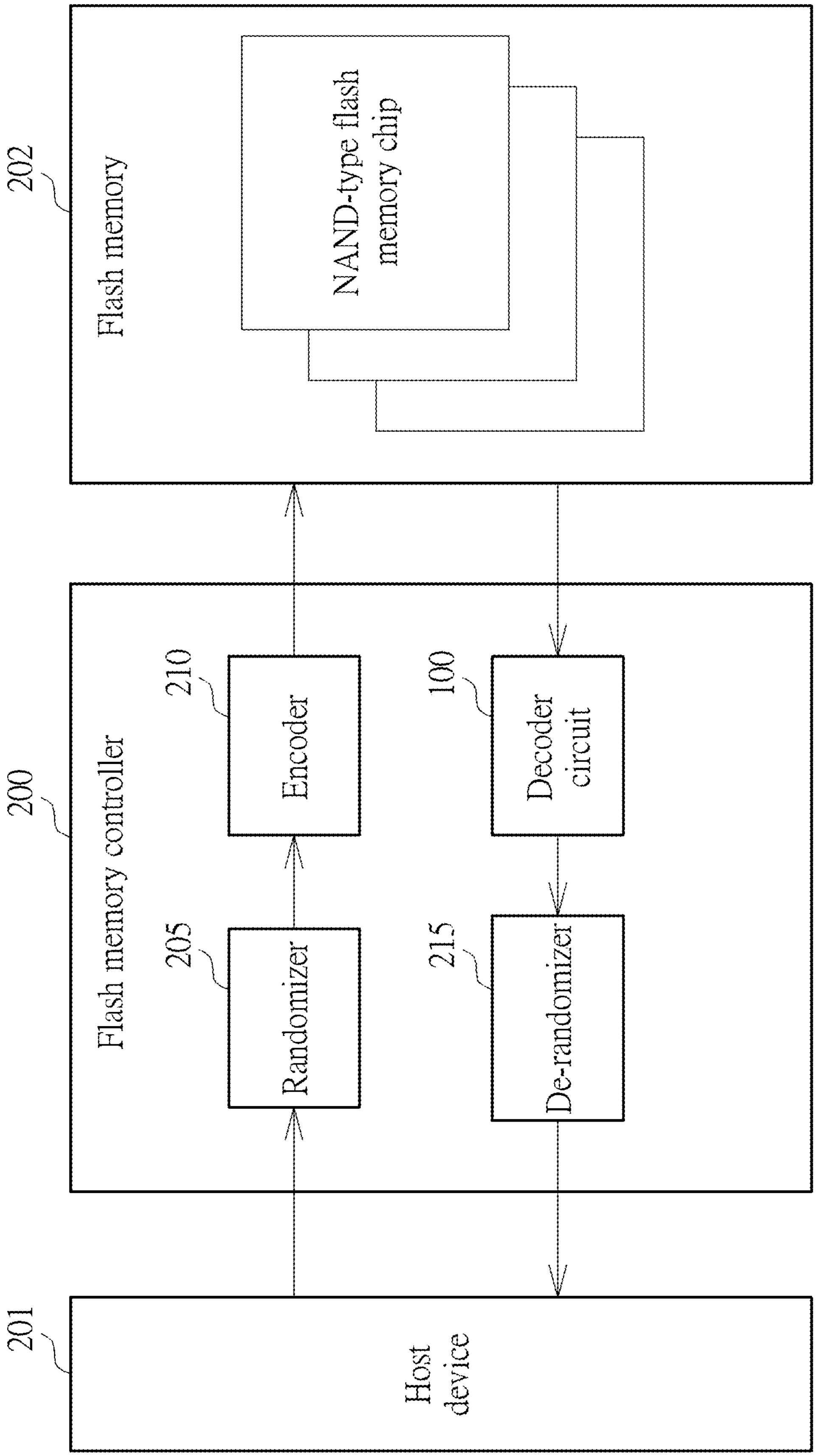
FIG. 3 is a schematic diagram of a flash memory controller including the decoder circuit as shown in FIG. 1 according to an embodiment of the present invention.

FIG. 3 is a schematic diagram of a flash memory controller 200 including the decoder circuit 100 as shown in FIG. 1 according to an embodiment of the present invention. As shown in FIG. 3, the flash memory controller 200 is coupled between a host device 200 and a flash memory 202. The flash memory controller 200 includes a randomizer 205, a de-randomizer 215, an encoder 210, and the decoder circuit 100 as shown in FIG. 1. The flash memory 202 includes multiple flash memory chips such as NAND-type flash memory chips. For example, when the host device 201 writes a data unit to one or more flash memory chips in the flash memory 202, the data unit to be written (for example simply called a write data) will first be sent to the flash memory controller 200. The randomizer 205 performs a randomization operation upon the write data to generate a randomized write data to eliminate the data skew of the write data to reduce the occurrence of bit errors. Then the encoder 210 performs an encoding processing operation such as low-density parity-check (LDPC) code operation (but not limited) upon the randomized write data to generate an encoded write data, so as to write the encoded write data to one or more flash memory chips of the flash memory 202. In addition, when the host device 201 reads a data unit from one or more flash memory chips in the flash memory 202, the data to be read (for example simply called a read data) will first be sent to the flash memory controller 200. The decoder circuit 100 based on the novel iterative decoding operation described in the embodiment of FIG. 1 performs a decoding processing operation (such as LDPC decoding processing, but not limited to) upon the read data (the read data at this time is for example a channel value of an input data) to generate a decoded read data so as to significantly reduce the power consumption of the flash memory control 200, and transmits the decoded read data to the de-randomizer 215. Then the de-randomizer 215 performs a de-randomization operation upon the decoded read data to generate a de-randomize read data to send the de-randomized read data to the host device 201. The randomizer 205 and the de-randomizer 215 operate in pairs. In another embodiment, the flash memory controller 200 may exclude the randomizer 205 and the de-randomizer 215; this example is also applicable in the present invention. By using the decoder circuit 100 shown in FIG. 1 to skip the calculations of a certain or some bit chunks in the subsequent iterative decoding operation, this can improve the decoding correction capability, so that the read data read out from the flash memory 202 can be decoded more accurately.

Figure 4:
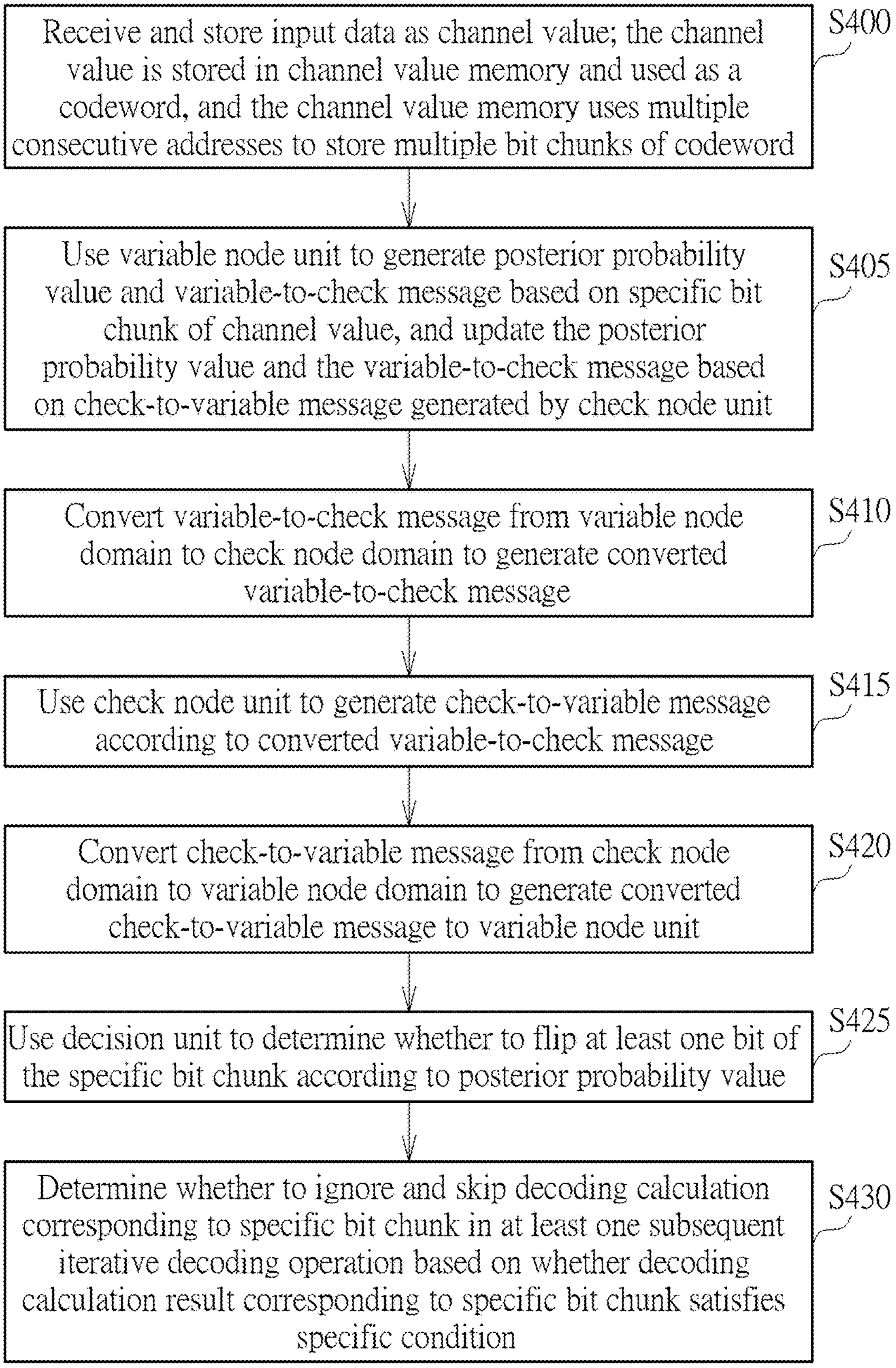
FIG. 4 is a schematic diagram of operation flow of a decoding method of a decoder circuit according to an embodiment of the present invention.

In order to make readers more clearly understand the spirits of the present invention, FIG. 4 is provided. FIG. 4 is a schematic diagram showing the operation flow of a decoding method of a decoder circuit according to an embodiment of the present invention. The steps are described below:

Step S400: provide a channel value memory to receive and store an input data as a channel value; the channel value is stored in the channel value memory and used as a codeword, and the channel value memory uses multiple consecutive addresses to store multiple bit chunks of the codeword;

Step S405: use a variable node unit to generate a posterior probability value and a variable-to-check message based on a specific bit chunk of the channel value, and update the posterior probability value and the variable-to-check message based on a check-to-variable message generated by a check node unit;

Step S410: convert the variable-to-check message from a variable node domain to a check node domain to generate a converted variable-to-check message;

Step S415: use the check node unit to generate the check-to-variable message according to the converted variable-to-check message;

Step S420: convert the check-to-variable message from the check node domain to the variable node domain to generate a converted check-to-variable message to the variable node unit;

Step S425: use a decision unit to determine whether to flip at least one bit of the specific bit chunk according to the posterior probability value; and Step S430: determine whether to ignore and skip the decoding calculation corresponding to the specific bit chunk in at least one subsequent iterative decoding operation based on whether a decoding calculation result corresponding to the specific bit chunk satisfies a specific condition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A decoder circuit, comprising:

a channel value memory, for receiving and storing an input data as a channel value, the channel value being stored in the channel value memory as a codeword, the channel value memory being configured to use multiple consecutive addresses to store multiple bit chunks of the codeword;

a variable node unit, coupled to the channel value memory, for generating a posterior probability value and a variable-to-check message based on a specific bit chunk of the channel value and for updating the posterior probability value and the variable-to-check message according to a check-to-variable message generated by a check node unit;

a first barrel shifter, coupled to the variable node unit, for converting the variable-to-check message from a variable node domain to a check node domain to generate a converted variable-to-check message;

the check node unit, coupled to the first barrel shifter, for generating the check-to-variable message according to the converted variable-to-check message;

a second barrel shifter, coupled to the check node unit, for converting the check-to-variable message from the check node domain to the variable node domain to generate a converted check-to-variable message to the variable node unit;

a decision unit, coupled to the variable node unit, for determining whether to flip at least one bit of the specific bit chunk based on the posterior probability value; and a strategy unit, coupled to the channel value memory, the variable node unit, the decision unit, and the check node unit, for determining whether to ignore and skip a decoding calculation corresponding to the specific bit chunk in at least one subsequent iterative decoding operation based on whether a decoding calculation result corresponding to the specific bit chunk satisfies a specific condition;

wherein, in a default setting, the strategy unit sequentially outputs the multiple consecutive addresses to the channel value memory to control the channel value memory to sequentially output the multiple bit chunks to the variable node unit in an iterative decoding operation, so that the variable node unit respectively and sequentially performs decoding calculations for the multiple bit chunks; when the decoding calculation result of the specific chunk satisfies a specific condition, the strategy unit ignores and skips an output of a specific address corresponding to the specific bit chunk in the at least one subsequent iterative decoding operation so as to control the channel value memory to not output the specific bit chunk to the variable node unit in the at least one subsequent iterative decoding operation to make the variable node unit ignore and skip the decoding calculation for the specific bit chunk in the at least one subsequent iterative decoding operation.

2. The decoder circuit of claim 1, wherein the strategy unit determines whether the decoding calculation result of the specific bit chunk satisfies the specific condition based on at least one among the posterior probability value outputted by the variable node unit, a flip operation result generated by the decision unit, and a minimum check-to-variable message and at least one sub-minimum check-to-variable message generated by the check node unit.

3. The decoder circuit of claim 2, wherein the strategy unit compares an absolute value of the posterior probability value with a specific threshold value; when the absolute value of the posterior probability value is greater than the threshold value, the strategy unit determines that the posterior probability value is more reliable, and determines that the decoding calculation result of the specific bit chunk satisfies the specific condition; and, when the absolute value of the posterior probability value is smaller than the specific threshold value, the strategy unit determines that the decoding calculation result of the specific bit chunk does not satisfy the specific condition.

4. The decoder circuit of claim 2, wherein when the flip operation result generated by the decision unit indicates that multiple bits of the specific bit chunk have been decoded in multiple iterative decoding operations and are not flipped, the strategy unit determines that the decoding calculation result of the specific bit chunk satisfies the specific condition.

5. The decoder circuit of claim 2, wherein the strategy unit is used to compare a specific reference threshold with the minimum check-to-variable message generated by the check node unit and compare the specific reference threshold with the at least one sub-minimum check-to-variable message to determine whether the decoding calculation result of the specific bit chunk satisfies the specific condition.

6. The decoder circuit of claim 1, being used and included in a flash memory controller.

7. A decoding method of a decoder circuit, comprising:

providing a channel value memory for receiving and storing an input data as a channel value, the channel value being stored in the channel value memory as a codeword, the channel value memory being configured to use multiple consecutive addresses to store multiple bit chunks of the codeword;

using a variable node unit to generate a posterior probability value and a variable-to-check message based on a specific bit chunk of the channel value and to update the posterior probability value and the variable-to-check message according to a check-to-variable message generated by a check node unit;

converting the variable-to-check message from a variable node domain to a check node domain to generate a converted variable-to-check message;

using the check node unit to generate the check-to-variable message according to the converted variable-to-check message;

converting the check-to-variable message from the check node domain to the variable node domain to generate a converted check-to-variable message to the variable node unit;

using a decision unit to determine whether to flip at least one bit of the specific bit chunk based on the posterior probability value;

determining whether to ignore and skip a decoding calculation corresponding to the specific bit chunk in at least one subsequent iterative decoding operation based on whether a decoding calculation result corresponding to the specific bit chunk satisfies a specific condition;

in a default setting, sequentially outputting the multiple consecutive addresses to the channel value memory to control the channel value memory to sequentially output the multiple bit chunks to the variable node unit in an iterative decoding operation, to make the variable node unit respectively and sequentially perform decoding calculations for the multiple bit chunks; and when the decoding calculation result of the specific chunk satisfies a specific condition, ignoring and skipping an output of a specific address corresponding to the specific bit chunk in the at least one subsequent iterative decoding operation so as to control the channel value memory to not output the specific bit chunk to the variable node unit in the at least one subsequent iterative decoding operation to make the variable node unit ignore and skip the decoding calculation for the specific bit chunk in the at least one subsequent iterative decoding operation.

8. The decoding method of claim 7, further comprising:

determining whether the decoding calculation result of the specific bit chunk satisfies the specific condition based on at least one among the posterior probability value outputted by the variable node unit, a flip operation result generated by the decision unit, and a minimum check-to-variable message and at least one sub-minimum check-to-variable message generated by the check node unit.

9. The decoding method of claim 8, further comprising:

comparing an absolute value of the posterior probability value with a specific threshold value;

when the absolute value of the posterior probability value is greater than the threshold value, determining that the posterior probability value is more reliable, and determining that the decoding calculation result of the specific bit chunk satisfies the specific condition; and when the absolute value of the posterior probability value is smaller than the specific threshold value, determining that the decoding calculation result of the specific bit chunk does not satisfy the specific condition.

10. The decoding method of claim 8, further comprising:

when the flip operation result generated by the decision unit indicates that multiple bits of the specific bit chunk have been decoded in multiple iterative decoding operations and are not flipped, determining that the decoding calculation result of the specific bit chunk satisfies the specific condition.

11. The decoding method of claim 8, further comprising:

comparing a specific reference threshold with the minimum check-to-variable message generated by the check node unit and comparing the specific reference threshold with the at least one sub-minimum check-to-variable message to determine whether the decoding calculation result of the specific bit chunk satisfies the specific condition.

12. A flash memory controller, comprising:

an encoder, for performing a encoding operation upon a write data sent from a host device to write the write data into a flash memory; and a decoder circuit, for performing a decoding operation upon a read data read out from the flash memory to generate a decoded read data;

wherein the decoder circuit comprises:

a channel value memory, for receiving and storing an input data as a channel value, the channel value being stored in the channel value memory as a codeword, the channel value memory being configured to use multiple consecutive addresses to store multiple bit chunks of the codeword;

a variable node unit, coupled to the channel value memory, for generating a posterior probability value and a variable-to-check message based on a specific bit chunk of the channel value and for updating the posterior probability value and the variable-to-check message according to a check-to-variable message generated by a check node unit;

a first barrel shifter, coupled to the variable node unit, for converting the variable-to-check message from a variable node domain to a check node domain to generate a converted variable-to-check message;

the check node unit, coupled to the first barrel shifter, for generating the check-to-variable message according to the converted variable-to-check message;

a second barrel shifter, coupled to the check node unit, for converting the check-to-variable message from the check node domain to the variable node domain to generate a converted check-to-variable message to the variable node unit;

a decision unit, coupled to the variable node unit, for determining whether to flip at least one bit of the specific bit chunk based on the posterior probability value; and a strategy unit, coupled to the channel value memory, the variable node unit, the decision unit, and the check node unit, for determining whether to ignore and skip a decoding calculation corresponding to the specific bit chunk in at least one subsequent iterative decoding operation based on whether a decoding calculation result corresponding to the specific bit chunk satisfies a specific condition;

wherein, in a default setting, the strategy unit sequentially outputs the multiple consecutive addresses to the channel value memory to control the channel value memory to sequentially output the multiple bit chunks to the variable node unit in an iterative decoding operation, so that the variable node unit respectively and sequentially performs decoding calculations for the multiple bit chunks; when the decoding calculation result of the specific chunk satisfies a specific condition, the strategy unit ignores and skips an output of a specific address corresponding to the specific bit chunk in the at least one subsequent iterative decoding operation so as to control the channel value memory to not output the specific bit chunk to the variable node unit in the at least one subsequent iterative decoding operation to make the variable node unit ignore and skip the decoding calculation for the specific bit chunk in the at least one subsequent iterative decoding operation.

* * * * *